United States Patent
Areny et al.

(10) Patent No.: US 8,803,708 B2
(45) Date of Patent: Aug. 12, 2014

(54) METHOD AND APPARATUS FOR CONTINUOUSLY DETECTING THE PRESENCE OF VEHICLES, WITH AN OPTICAL SENSOR AND A MAGNETIC SENSOR

(75) Inventors: Ramon Pallàs Areny, Barcelona (ES); Jaime Oscar Casas Piedrafita, Barcelona (ES); Ernesto Sifuentes De La Hoya, Barcelona (ES)

(73) Assignee: Universitat Politecnica de Catalunya, Barcelona (ES)

( * ) Notice: Subject to any disclaimer, the term of this patent is extended or adjusted under 35 U.S.C. 154(b) by 239 days.

(21) Appl. No.: 13/498,073

(22) PCT Filed: Aug. 31, 2010

(86) PCT No.: PCT/ES2010/000364
§ 371 (c)(1),
(2), (4) Date: Mar. 23, 2012

(87) PCT Pub. No.: WO2011/036313
PCT Pub. Date: Mar. 31, 2011

(65) Prior Publication Data
US 2012/0274483 A1 Nov. 1, 2012

(30) Foreign Application Priority Data
Sep. 28, 2009 (ES) .................................. 200901970

(51) Int. Cl.
*G08B 29/00* (2006.01)

(52) U.S. Cl.
USPC ........... 340/941; 340/435; 340/436; 340/437; 340/425.5; 340/903

(58) Field of Classification Search
USPC ......... 340/435, 436, 437, 425.5, 903; 701/29, 701/36, 301
See application file for complete search history.

(56) References Cited

U.S. PATENT DOCUMENTS 5,491,475 A 2/1996 Rouse et al.
5,777,951 A 7/1998 Mitschele et al.
(Continued)

FOREIGN PATENT DOCUMENTS

CA 2 363 915 5/2003
WO WO 96/01461 1/1996
WO WO 2006/063079 6/2006

OTHER PUBLICATIONS

International Search Report dated Dec. 29, 2010 in Application No. PCT/ES2010/000364.
(Continued)

*Primary Examiner* — Daryl Pope
(74) *Attorney, Agent, or Firm* — Staas & Halsey LLP (57) ABSTRACT

A method and apparatus for continuous, non-intermittent, detection of vehicles based on a light detector for detecting a change in illumination when a vehicle arrives or departs, and on a use of the light detection to activate a magnetic sensor, a sensitivity of which is adjusted to detect only those magnetic disturbances sufficiently large to be able to be attributed to a vehicle which is over the sensor. Both the light detector and the magnetic sensor are connected directly to a digital controller without a need for active electronic components or their own or a shared power supply source. The light detector may be fixed or portable, wireless or connected by cables, and may operate independently or as part of a sensor network.

11 Claims, 4 Drawing Sheets

(56) References Cited

U.S. PATENT DOCUMENTS

| | | | |
|---|---|---|---|
| 6,546,344 B1 | 4/2003 | Rodrian et al. | |
| 6,847,500 B2* | 1/2005 | Jove et al. | 360/46 |
| 2002/0022927 A1* | 2/2002 | Lemelson et al. | 701/301 |
| 2002/0190856 A1 | 12/2002 | Howard | |
| 2004/0201672 A1* | 10/2004 | Varadarajan et al. | 348/148 |
| 2005/0273212 A1* | 12/2005 | Hougen | 701/1 |
| 2006/0202863 A1 | 9/2006 | Kavaler | |
| 2012/0016623 A1* | 1/2012 | Hayner | 702/141 |
| 2013/0267194 A1* | 10/2013 | Breed | 455/404.2 |

OTHER PUBLICATIONS

International Preliminary Report on Patentability dated Nov. 17, 2011 in Application No. PCT/ES2010/000364.
Written Opinion in Application No. PCT/ES2010/000364.
Reply to Written Opinion dated Jul. 25, 2011 in Application No. PCT/ES2010/000364.
Michael J. Caruso and Lucky S. Withanawasam, "*Vehicle Detection and Compass Applications using AMR Magnetic Sensors*", Honeywell, SSEC, 12001 State Highway 55, Plymouth, MN USA 55441, www.ssec.honeywell.com, 900247, May 1999 (13 pages).
Pavel Ripka, "*Magnetic Sensors for Traffic Control*", Dept. of Measurement, Faculty of Electrical Engineering CTU, Technicka 2, 166 27 Praha 6, Czech Republic, ripka@feld.cvut.cz, Proceedings of the International Symposium on Measurement and Control in Robotics (ISMCR 99), Tokyo, vol. 10, pp. 241-246, 1999.
Gordon Rouse and Howard French, Hiroshi Sasaki and Takeshi Kawai, "*A Solid-State Vehicle Detector for Roadway Applications*", Honeywell Technology Center, Plymouth, MN, Yamatake-Honeywell Solid-State Advance Center, Fujisawa City, Japan, IEEE Proceedings on Vehicle Navigation and Information Systems Conference, Seattle, USA, pp. 11-16, Jul. 1995.
Stanley V. Marshall, "*Vehicle Detection Using a Magnetic Field Sensor*", IEEE Transactions on Vehicular Technology, vol. 27, No. 2, pp. 65-68, May 1978.
Richard Lao, Thermoscan Inc., David Czajkowski, Space Electronics, Inc., "*Magnetoresistors for Automobile Detection and Traffic Control*", Sensors, pp. 70-73, Apr. 1996.
English translation of WO 96/01461, Published Jan. 18, 1996.

\* cited by examiner

(A) Vehicle produced shade. (B) Shadow of a person. (C) Vehicle light

FIG. 5

METHOD AND APPARATUS FOR CONTINUOUSLY DETECTING THE PRESENCE OF VEHICLES, WITH AN OPTICAL SENSOR AND A MAGNETIC SENSOR

This application claims the benefit under U.S.C. Section 371, of PCT International Application No. PCT/ES2010/000364, filed Aug. 31, 2010 and Spanish Patent Application No. 200901970 filed Sep. 28, 2009, the contents of which are incorporated herein by reference.

The present invention relates to a method and an apparatus for ascertaining whether a vehicle is present in a particular area, more particularly to a method based on a level of illumination sensor and a magnetic sensor disposed in the flooring in said area.

OBJECT

The object of the present invention is to develop a method for continuously detecting whether a vehicle is present in a predetermined area, using therefore a passive optical sensor which detects the shade condition produced by the vehicle and a magnetic sensor which confirms whether said shade condition is due to a vehicle which is over the sensor, or that it may be due to another cause reducing the level of illumination. A second object of the present invention is to develop an apparatus offering an output signal indicating whether or not there is a vehicle in a predetermined area, and having an energy consumption sufficiently low to be able to operate with a battery.

BACKGROUND OF THE INVENTION

Knowing whether there is a vehicle in a predetermined area is a common need in the management of car parks, railroad crossings, emergency exits, access control, security areas and other applications where decisions must be made based on the presence or absence of a vehicle in a particular area. In covered areas, with some form of row, the presence or a vehicle in a particular area may be ascertained by one or more sensors suspended from the roof or from a structure attached thereto and situated directly over the area it is wanted to control. A common way of doing this is by way of sensors based on some type of radiation, for example ultrasonic or infrared radiation, because the transit time between an emitter and a receiver depends on whether the radiation emitted by the emitter is reflected from the floor or from another closer object, as may be the roof of a vehicle. An alternative solution, not requiring a sensor for each specific area it is wanted to control, is to install one or more television cameras directed towards the area of interest. By way of image analysis algorithms, it is possible to ascertain the number of vehicles there are in an area covered by the cameras. This solution is technically more complex, since it is necessary to be able to detect vehicles which are partly or completely hidden behind others, and it requires having a support for mounting the camera or cameras. In a building, this support may be fixed to a wall or on the ceiling, but in roofless areas, it is necessary to install some kind of post.

A cheaper alternative to the cameras may be placing detectors in the flooring of each lot it is desired to control. For the detection, one or other of the methods based on the emission and reception of some type of radiation which are normally applied from the ceiling may be adapted. But it is simpler to base the detection on a passive system which captures the alteration that the presence of a vehicle produces in some prior condition of the surroundings. Furthermore, the energy consumption of the passive detectors will be lower because it is not necessary to create said preexisting condition, unlike the detectors based on the emission and reception of radiation (radiofrequency, optical, mechanical-ultrasonic) which have to generate the radiation they emit. In large parking areas, and in general where there is no infrastructure allowing for an immediate supply of electric power to each watched lot, the possibility of supplying each detector from batteries reduces the installation costs. In these cases, another important quality of the detector is that its energy consumption should be the lowest possible.

A physical magnitude that can be measured in the ground and which changes when a vehicle passes is the mechanical stress in an element over which the wheel passes. Thus, WO/1996/01461 of Antonio Hernando Grande et al. describes a device for detecting parked vehicles based on detecting the mechanical stress produced by the vehicle wheel on its passage over a wire having one end fixed in a metal support and the other end of which is fixed to a semicircular support where there is adhered a strip of amorphous magnetic material. This strip forms the nucleus of a winding collecting the electromotive force induced by the passage of the wheel over the wire. It will be appreciated that, like happens with the piezoelectric sensors, pneumatic tubes and inductive coils, which detect a short transitory change due to the passage of the vehicle, this sensor has to be continuously in the active state, with the consequent energy consumption, and cannot detect stationary vehicles. Furthermore, a vehicle which, for example, passes over the sensor when going towards another parking place will give a signal when passing over the sensor of each place, but will end up parked in a particular place, whereby the detection count is greater than the number of parked vehicles.

Another physical magnitude which is altered with the passage of a vehicle, and even with its mere presence, is the magnetic field, because the abundant ferromagnetic material in the vehicles causes a disturbance in the Earth's magnetic field which lasts while the vehicle is present. This disturbance may be detected, for example, by magnetoresistive sensors (based on the magnetoresistive, anisotropic-AMR or giant-GMR effect) and therefore this method has been much applied to detect the passage of vehicles and somewhat less for detecting their presence [see, for example, M. J. Caruso, L. S. Withanawasam, "Vehicle Detection and Compass Applications using AMR Magnetic Sensors" http://www.ssec.honeywell.com/magnetic/datasheets/amr.pdf; P. Ripka, "Magnetic sensors for traffic control," *Proceedings of the International Symposium on Measurement and Control in Robotics* (ISMCR 99), Tokyo, vol. 10, pp. 241-246, 1999; G. Rouse, H. French, H. Sasaki "A solid-state vehicle detector for roadway applications," *IEEE Proceedings on Vehicle Navigation and Information Systems Conference*, Seattle, USA, pp. 11-16, July 1995; S. V. Marshall, "Vehicle Detection Using a Magnetic Field Sensor," *IEEE Transactions on Vehicular Technology*, vol. 27, no. 2, pp. 65-68, May 1978; R. Lao, D. Czajkowski, "Magnetoresistors for Automobile Detection and Traffic Control," *Sensors*, pp. 70-73, April 1996]. To detect a vehicle, it is sufficient to measure the magnetic disturbance in the direction of the predominant component of the Earth's magnetic field, which changes at different points of the Earth, according to the latitude, although it is also possible to detect a vehicle by measuring in other directions.

One problem common to all these applications based on magnetoresistors is that the energy consumption of these sensors is relatively high because their electrical resistance is of the order of 1 kΩ to 5 kΩ, and therefore if they are powered continuously, they can drain a battery in a very short time. If there is more than one sensor, for example, in sensor nodes including a magnetic sensor for detecting vehicles and several specific sensors for ascertaining the environmental conditions (temperature, rain, ice, etc.) and the system has no wired connection, for example, as disclosed in US 20060202863 A1 of Robert Kavaler, the energy consumption problem is even more serious. Furthermore, the refinements in magnetoresistor-based magnetometers applied to vehicle detection use an analog-to-digital converter as means for obtaining a digital signal corresponding to the magnetic disturbance measured, and said converter demands conditioning of the output from the magnetic sensor, which is obtained by amplifiers, as described for example in U.S. Pat. No. 5,491,475 to Gordon F. Rouse and William M. Volna and U.S. Pat. No. 6,546,344 to James A. Rodrian and Donald R. Janke. These signal conditioning circuits with amplifiers, filters, etc. imply additional energy consumption.

One obvious system for reducing the energy consumption is to power the detector intermittently at predetermined time intervals. But if it is wanted to have a reliable presence or absence detection, said intervals must be sufficiently short, and consequently the energy saving will greatly depend on the occupation rate of the area. US 20020190856 of Charles Howard discloses a solution for avoiding the magnetic sensor from having to be in continuous operation. It consists of using a vibration sensor which detects the vibration in the ground caused by a vehicle and which activates the magnetic sensor when vibration occurs and deactivates it when there has been no vibration for a period of time. The efficacy of this solution depends on the one hand on the consumption of the vibration sensor, which must be continuously active if continuous detection is wanted, and on the knowledge of the vibration signal which may be considered to be an indicator of the presence of a vehicle in the area of interest. But, in any case, the vibration sensor cannot detect the presence of a motionless vehicle. The vibration sensors cited in US 20020190856 are an electret microphone EM9765-422, the consumption of which is 0.5 mA when powered at 4.5V and an accelerometer ADXL202, the typical consumption of which when powered at 5 V is 0.6 mA. To these consumption rates, it is necessary to add the consumption of the components required for conditioning the output signal of the vibration sensor used, of the controller to which its signals are communicated and of the power supply for the ensemble.

WO-20061063079A2 discloses a detector assembly to detect presence of a vehicle, including a microprocessor and a passive magnetic sensor which, in one embodiment, is coupled to an active sensor like ultra-sonic, infra-red, radar, laser, capacitive or photoelectric. The operating way of this detector assembly consists in that the microcontroller periodically activates the magnetic sensor to detect the presence of a vehicle and, when the vehicle has been detected by said magnetic sensor, the active sensor is activated to confirm this presence. The position from where the detection is carried out is not specified.

The analysis of the information available to date shows that there is no method for continuously and reliably detecting the presence of a vehicle in a particular area and which, in the absence of vehicles has an energy consumption of less than 30 microwatts (10 microamperes with a supply of 3 V). We have found that by placing an optical sensor in the flooring which when detecting a low level of illumination starts up a magnetic sensor in the same point, to check whether the reduced level of illumination is due to a magnetic disturbance, allows a continuous reliable detection of the presence of vehicles, with an energy consumption much lower than that of a continuously powered magnetic sensor, or that of a magnetic sensor activated when a vibration sensor detects a signal indicating the approach of a vehicle.

DESCRIPTION OF THE INVENTION

We have developed a new method and apparatus for detecting whether there is a vehicle present in a predetermined area, by way of a detector disposed in the flooring of the area it is desired to control, and which consists of a passive optical sensor detecting the shade produced by the vehicle, and from which information there is controlled the supply to, and the measuring by, a magnetoresistive sensor which confirms whether said shade is due to a vehicle which is over the sensor or, on the contrary, the illumination has been reduced for other reasons. The detector may be fixed or portable, wireless or connected by cables, and may operate independently or as part of a sensor network.

The apparatus developed is based on a digital controller to which a passive optical sensor and a magnetic sensor are connected, by way of the corresponding electronic interfaces, a communications circuit (transceiver or modem) and a supply system supplying current to the controller and to the transceiver/modem, but which is not connected to either of the two sensors, unlike for example the invention disclosed in US 20020190856, where the sensors are connected to the supply source by circuits allowing the sensors to be activated intermittently. In our invention, both the controller and the transceiver/modem are normally in a stand-by state, in which their consumption is very low, and the interface circuit for the optical sensor and the interface circuit for the magnetic sensor are connected to different output terminals of the controller, which may provide for each of said terminals to have a high (digital "1") or low (digital "0") voltage level, in terms of the logic voltage levels of the microelectronics technology with which the controller is manufactured, or have one terminal in a state of high impedance (HZ). By these connections, the optical sensor and the magnetic sensor are powered from the controller, without having to connect each sensor to a supply source. This supply of the sensors from the controller will be possible provided that the design of the interface circuits of each sensor ensures that the controller ports will be able to supply the necessary current, which furthermore should be very low or flow during a very short time.

The interface circuit for the optical sensor has an output connected to two input terminals of the digital controller: one of these terminals (EA) is connected to an analog-to-digital converter and the other (EI) corresponds to an input which may be enabled to interrupt the controller when there is a transition between the two voltage levels corresponding to the logic states "1" and "0". The interface circuit for the magnetic sensor is connected to one or more input terminals of the controller, as desirable to be able to measure the value of the magnetic field in the area where the sensor is located. The magnetic sensor, which measures the magnetic field B on one axis, may be prepared to measure in the direction of the predominant component of the Earth's magnetic field, depending on the latitude at which the sensor is located, or in another direction in which the component of the Earth's magnetic field is also large. The timing of the operations performed by the controller is determined by the frequency of a clock signal which may be chosen from among various available depending on the information provided by the sensors, as described hereinafter.

When the apparatus is switched on, it remains in a stand-by state wherein the optical sensor is powered from the controller and has a very low current drain thanks to the design of its interface circuit; on the other hand, the interface circuit of the magnetic sensor and, of course, the magnetic sensor, does not receive any supply voltage. The controller operates in a mode not requiring any clock signal, and from which it can exit only when there is an external interrupt. When the level of illumination detected by the optical sensor is below a predefined value Emin, the output voltage of its interface circuit changes sufficiently for the controller to interpret said change at its input EI as a request to leave the stand-by state and start measuring the magnetic field. To this end, the controller passes to operating with a fast clock, activates the magnetic sensor, measures the output or outputs of its interface circuit and from them calculates the value of the magnetic field Bm. Then, the controller compares this value Bm with a reference value Bref obtained when measuring in the absence of vehicles, and if the change is greater than a predetermined value Bv, a vehicle is deemed to be over it and a signal is generated indicating "presence" (place occupied). The magnetic field may be continued to be measured every T1 seconds to check whether the difference between the measured value Bm and the reference value Bref is still greater than Bv. When the difference between Bm and Bref is less than Bv, the vehicle is deemed to have departed, and consequently an "absence" signal (place free) is generated, the power supply to the magnetic sensor circuit is interrupted and the stand-by state is resumed. The time T1 may be chosen according to the rate of occupation and entry and departure of vehicles in the area. For areas having a high occupation rate and low mobility, for example, T1 may be long.

If immediately after the optical sensor has detected a low level of illumination the difference between the measured value Bm of the magnetic field and the reference value Bref of the magnetic field is below the value Bv, no vehicle presence (place occupied) signal is emitted and a different routine from that followed when a change greater than Bv has been detected is entered. It is deemed that the shade is not due to the presence of a vehicle over the sensor, but that it is due to other causes (it has grown dark and there is no artificial lighting, there is an object over the sensor, a nearby car projects a dense shadow, etc.) In this other routine, every T2 seconds it measures the value of the level of illumination, from the signal connected to its input EA, and the value of the magnetic field as has been measured before. If in any of these periodical measurements the difference between the measured value Bm of the magnetic field and the reference value Bref is greater than Bv, a "presence" signal is generated and measurements are continued until either the difference is less than Bv, or the level of illumination measured is above Emin. In both cases, an "absence" signal is generated and the stand-by state is entered. If at any time the difference between Bm and Bref is greater than Bv when the level of illumination is above Emin, an alarm signal is generated, both if there has previously been a presence detection or not.

From the foregoing disclosure, it will be gathered that the optical sensor is activated all the time: while there is no vehicle over the detector, the level of illumination sensor is activated continuously to be able to detect a sudden reduction of the level of illumination; if there is a vehicle, the level of illumination sensor continues to be active to be able to detect the departure of the vehicle, and the magnetic sensor periodically checks that the vehicle is still present. When there is a doubt as to the presence of a vehicle because the level of illumination sensor detects darkness but the magnetic sensor does not detect a magnetic disturbance, the optical sensor is continuously activated, to detect the disappearance of the cause of the darkness, while the value of the level of illumination and the magnetic field are periodically measured. When the level of illumination is high but the magnetic field sensor detects a significant magnetic disturbance, an alarm is emitted.

To reduce the energy consumption, when the digital controller changes state it selects the clock frequency most appropriate for the tasks it has to perform in that new state. Thus, for example, in stand-by for an interrupt in EI, all the clock oscillators are stopped; in the intervals between the measurements of B, a low frequency clock is selected, while for the measurement of B and the communication of signals a high frequency clock is selected. Also to reduce energy consumption, the interface circuits of the optical sensor and the magnetic sensor do not include any active electronic component. If the detector is not going to be used for a certain spell of time, the transceiver or modem can be left in the stand-by state, and all the internal peripherals of the controller, oscillators, analog-to-digital converter, etc. can be disabled and the optical sensor may even be deactivated because it is not directly connected to the power supply source of the detector but to a terminal of the controller, the voltage of which may be programmed.

The reference value Bref is obtained by measuring the magnetic field at the place where the sensor will be located in the absence of vehicles and nearby ferromagnetic objects. The measurement may be made with a magnetometer or with the magnetic sensor of the apparatus itself, in which case it can be periodically updated. This update must be made in the absence of vehicles.

BRIEF DESCRIPTION OF THE DRAWINGS

A preferred embodiment of the invention is described hereinafter with reference to the accompanying figures, in which.

DESCRIPTION OF A PREFERRED EMBODIMENT

Figure 1:
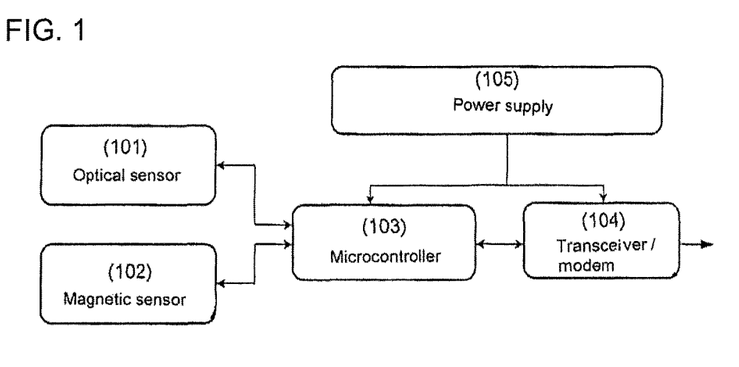
FIG. 1 is a block diagram of the continuous vehicle presence detector.

FIG. 1 shows a passive optical sensor 101 and a magnetic sensor 102 connected to a microcontroller 103 which in turn is connected to a wireless transceiver 104. The microcontroller includes an analog-to-digital converter. The power supply source 105 is connected to the microcontroller and to the transceiver, but not to the sensors nor to their interface circuits. Said sensors and interface circuits are only powered, when necessary, by the microcontroller itself.

Figure 2:
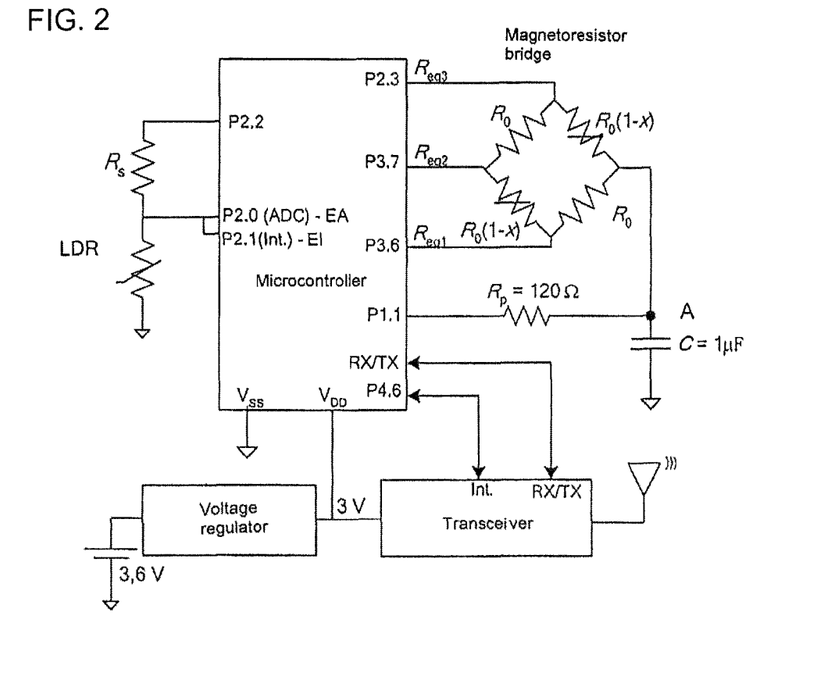
FIG. 2 shows a preferred embodiment of the invention.

To obtain a greater energy efficiency and in this way increase the active life of the apparatus when powered by batteries, it is necessary to use sensors whose electronic interfaces have a very low consumption, a digital controller and a transceiver whose consumption in a low activity state are very low, to choose a low power supply voltage (3 V for example) and manage it in such a way that at all times only the items which must of necessity be activated are being powered. FIG. 2 shows a preferred embodiment of the apparatus in which the passive optical sensor is an LDR (Light Dependent Resistor), and its interface circuit is a voltage divider where the resistor Rs is selected to have a high value so that when the LDR is illuminated, and therefore its resistance has a low value, the current consumption is very low. With Rs=920 kΩ, for example, if the microcontroller is powered at 3 V, the current in the LDR in daylight is around 3 microamperes. The output of the voltage divider is connected to an analog input (P2.0 acts as EA) of the microcontroller and to an input of external interrupts (P2.1 acts as EI). The voltage applied to the voltage divider is that at the output P2.2 of the microcontroller. An LDR meeting the necessary conditions is the NORPS-12 manufactured by Silonex, of Montreal (Quebec, Canada) and an appropriate microcontroller may be the MSP430F2274 manufactured by Texas Instruments, of Dallas (Tex., United States), which has an integrated analog-to-digital converter and five low power operating modes, one of which (the LPM4) has a consumption of only 0.1 microampere.

The magnetic sensor is a magnetoresistor bridge and its interface circuit is a capacitor C and a resistor Rp, such as described by E. Sifuentes, O. Casas, F. Reverter and R. Pallas Areny in Direct Interface circuit to linearize resistive sensor bridges, *Sensors and Actuators A*, Vol. 147 (2008), 210-215. In this interface, the bridge has one input node and three output nodes, the input node is connected to an output port of the microcontroller (P1.1 in FIG. 2) and to a capacitor C, the other terminal of which is grounded, while each output is connected to a different input of the microcontroller (P2.3, P3.7 and P3.6); the measuring process consists of charging (successively) the capacitor C by means of the voltage at the controller output (P1.1), set high, and then discharge said capacitor through the resistor bridge, using a different route each time, which route is determined by setting up two different ports of the microcontroller as inputs in high impedance state and the third port as output at level 0. An appropriate magnetic sensor is the AAH002, of NVE Corporation, Eden Prairie (Minn. United States). By selecting C to have 1 microfarad and Rp to have 120Ω, measuring times of the order of milliseconds are obtained. These are sufficient to detect parked vehicles or those which are moving slowly.

In this preferred embodiment, the transceiver is wireless, whereby it is connected to an antenna. A transceiver having a low power stand-by state (1 microampere) is the ETXR2 of Telegesis, High Wycombe (Bucks HP10 9QQ, U.K.). The power supply source consists of a battery and a 3 V voltage regulator. A low power regulator having a 3 V output is the TS9011 of Taiwan Semiconductor Company. An appropriate battery may be the TL-5135 of Tadiran Batteries, Kiryat Ekron (Israel), or any other high capacity, small volume battery.

To obtain a good vehicle presence or absence detection in a particular area, it is necessary on the one hand to know the level of illumination level at ground level at the sensor position, when there is a vehicle over it and for different level of illumination conditions of the surroundings: natural or artificial light, and on the other hand the predominant direction of the Earth's magnetic field in said area, or any other direction where the magnetic field component is large, and the magnetic disturbance produced by a vehicle parked over the apparatus. Generally speaking, the horizontal component will be predominant towards the Equator while the vertical component will be predominant towards the poles and for latitude 45°, both components will be similar.

Figure 3:
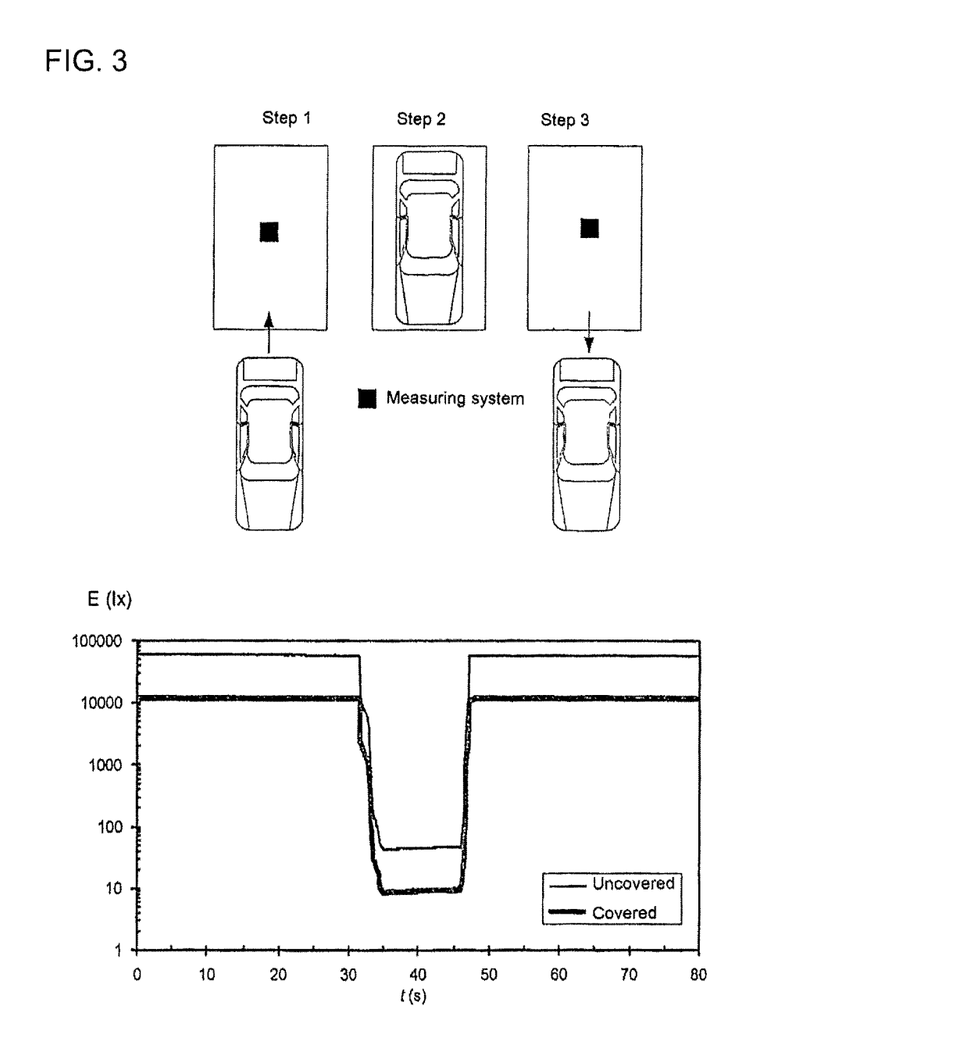
FIG. 3 shows the results of two experiments on the change of the level of illumination received by the optical sensor disposed in the flooring in the open air during the day.

FIG. 3 shows the results of two experiments on the change of the level of illumination received by the optical sensor, in the flooring in the open air and on a clear day (Feb. 27, 2009, 12.30 h), when there was a vehicle over it. In one of the experiments, the optical sensor was uncovered and in the other it was protected by a transparent plastics cover, which will be the normal use condition. In both experiments, the level of illumination is reduced by a factor of around 1000, whereby the detection is sure. The presence of a plastics cover reduces the level of illumination only by a factor of around 5, whereby a dirty cover will not necessarily cause a fault. But there is never any guarantee that the reduction of the level of illumination has been caused by a vehicle, and here lies the interest in measuring the magnetic disturbance.

Figure 4:
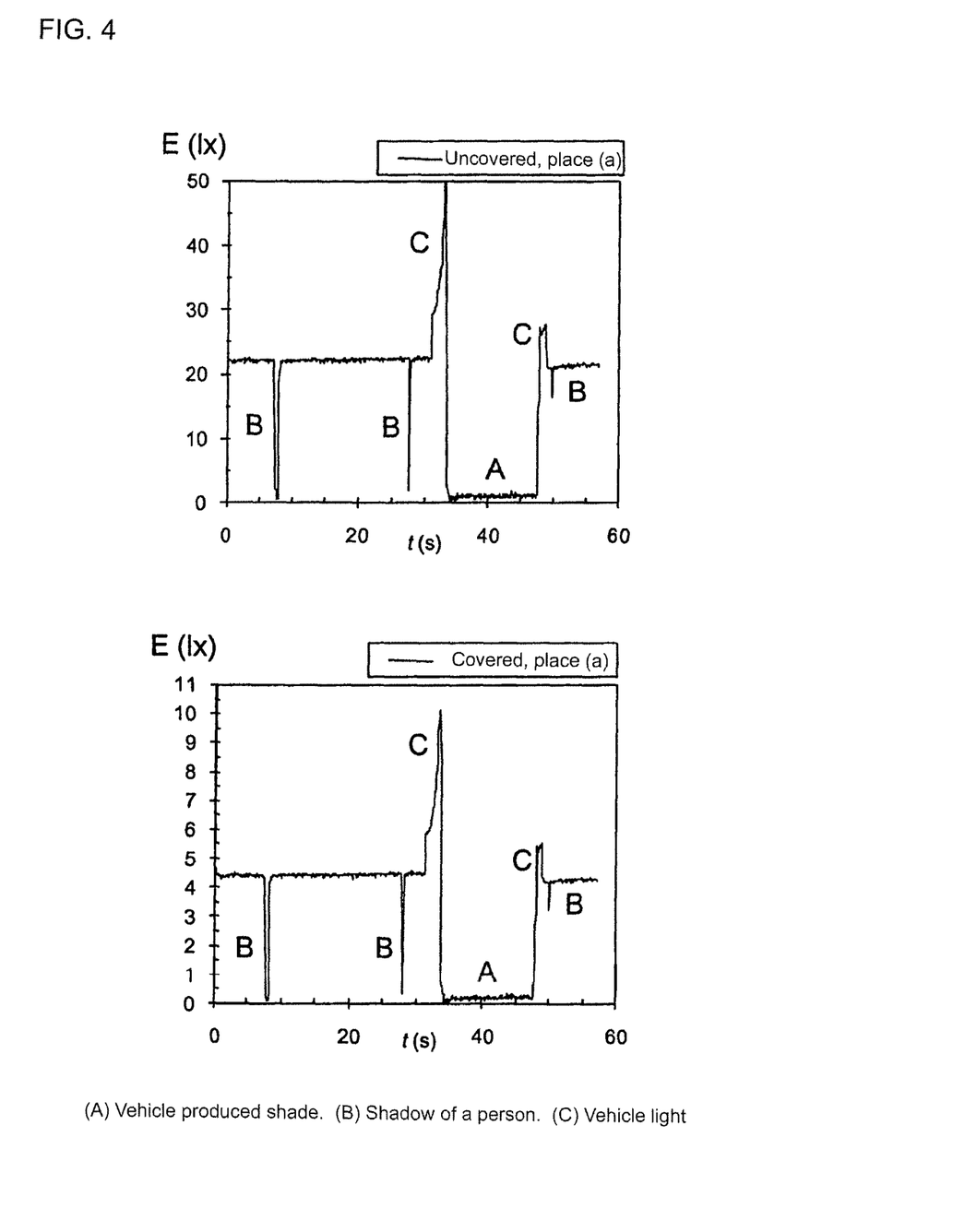
FIG. 4 shows the results of two experiments on the change of the level of illumination received by the optical sensor disposed in the flooring in the open air during the night, in an illuminated car park.

FIG. 4 shows two experiments carried out at night, in the same area as the FIG. 3 experiments, which was artificially illuminated according to the normal practice in open-air car parks, and which was at a distance from the luminaire. The level of illumination in the absence of a vehicle over the sensor is very low, whereby it may be desirable for the minimum level of illumination value Emin from which the magnetic sensor is activated to adapt gradually to the ambient lighting, measured for example through the analog-to-digital converter of the microcontroller. But, in any case, the experiment shows that when there is a vehicle the level of illumination still goes down a lot, by a factor of the order of 40. Nevertheless, even the shadow of a person passing close to the sensor may reduce the level of illumination as much as a vehicle does, as shown by the short transitory changes indicated with "B" in FIG. 4, and here lies the interest in detecting the magnetic disturbance.

Figure 5:
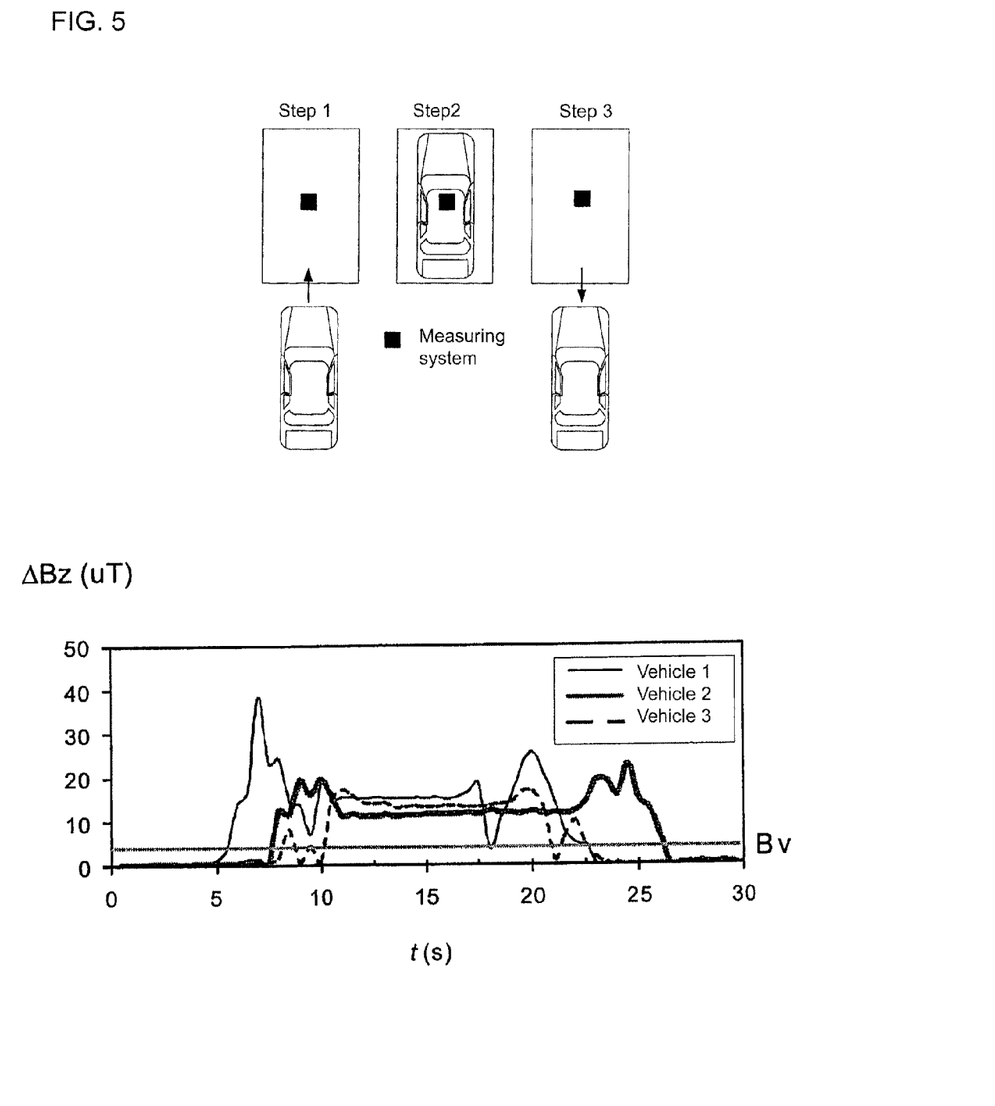
FIG. 5 shows the results of three experiments with three different vehicle models when they occupy and depart from an open air parking place and the detector is in the centre of the place.

FIG. 5 shows three experiments in which the magnetic disturbance has been measured in the vertical direction (in Castelldefels, Barcelona, Spain) by the magnetic sensor of FIG. 2 disposed in the centre of the area controlled, when a two-axle vehicle entered the area, remained in it for about 10 seconds and then departed. Each experiment was made with a different vehicle. It is observed that the magnetic disturbance is different for each vehicle model, but the pattern of the change is similar: there are two large peaks corresponding to the two axles (and to the engine which will be over one of them) and a smaller change corresponding to the central area of the vehicle. Furthermore, it is observed that the variation pattern is different from that which is obtained with magnetic sensors at a distance from the vehicle, which as Moon Ho Kang et al. show, in Experimental study of a vehicle detector with an AMR sensor, *Sensors and Actuators A*, 118 (2005), pp 278-284, consists of a single transition, monopolar or bipolar according to the direction in which the magnetic disturbance is measured. The placing of the magnetic sensor on the flooring of the area it is desired to control thus allows more details of the magnetic disturbance to be appreciated than with a magnetic sensor farther away. The results of these experiments allow a disturbance value of Bv=5 microteslas to be selected, so as to be able always to detect a vehicle. Nevertheless, a much smaller ferromagnetic object but much closer to the sensor can also produce a magnetic disturbance of a similar value. Thus the additional interest in having the light sensor always activated, because a small object close to the sensor will only reduce the level of illumination when it is right over the detector. On the other hand, since the magnetic disturbance of a vehicle will rarely exceed 50 microteslas, the microcontroller can be programmed so as not to consider that any vehicle is present in such case.

SUMMARY

In this patent of Invention there are described a method and an apparatus for detecting vehicles with a level of illumination sensor and a magnetic sensor installed in the flooring in the area where it is desired to ascertain the presence or absence of a vehicle, and connected to a digital controller. When the level of illumination sensor detects that there is a shade, a magnetoresistive sensor which measures the magnetic field is activated, and if its variation relative to when there is no vehicle exceeds a certain predefined threshold, the controller considers that there is a vehicle over the detector and communicates it over a transceiver, which may be wireless. If the magnetic field variation does not exceed the predefined threshold, it is considered that the cause of the shade is not a vehicle and the magnetic sensor makes periodic measurements until either a sufficiently large variation is detected, or the level of illumination increases. If the level of illumination is high and the variation of the magnetic field exceeds the predefined threshold, an alarm signal is emitted. Both sensors are connected only to the controller, not to any power supply source, and their connections are by way of interface circuits which do not include any active component, which reduces the current consumption when the sensors are activated. The level of illumination sensor is in a high impedance circuit which drains less than 3 microamperes, whereby it may be continuously activated without hardly affecting the detector consumption.

Having sufficiently described the invention, as well as a preferred embodiment, it should only be added that it is possible to modify its constitution and the materials used without separating from the scope thereof, as defined in the following claims.

The invention claimed is:

1. A method for using an apparatus for the continuous detection of the presence of a vehicle in a predetermined area, wherein the method is carried out from the ground and uses a dual principle of measurement based on a passive optical sensor and a magnetic field sensor, comprising
    said passive optical sensor and said magnetic field sensor are connected to a digital controller, from which the sensors are activated and powered;
    in a stand-by state, said digital controller remains in a low power consumption state and supplies power to said passive optical sensor, whereas said magnetic field sensor does not receive any power supply;
    in said stand-by state, said passive optical sensor detects a level of illumination, and when said detected level of illumination is below a predefined value, said passive optical sensor awakens said digital controller from the low power consumption state and said digital controller activates and powers said magnetic field sensor to confirm the presence of a vehicle by detecting and quantifying a magnetic disturbance in a direction in which the Earth's magnetic field is large in accordance with the latitude of the area where said apparatus is used.

2. A method according to claim 1, wherein:
    in said stand-by state, said digital controller operates in a mode not requiring any clock signal, and said digital controller exits from said mode when said digital controller receives an external interrupt from said passive optical sensor when the level of illumination is below the predefined value;
    by receiving said external interrupt, said digital controller moves to operate with a clock, activates and powers said magnetic field sensor, obtains a value of the magnetic field from said magnetic field sensor and deduces a change of the magnetic field with respect to a reference value of the magnetic field obtained in the absence of a vehicle;
    if the change in the magnetic field is greater than a predetermined value, the digital controller generates a signal indicating the presence of a vehicle and periodically obtains new values of the magnetic field from said magnetic field sensor;
    when, after having generated said signal indicating the presence of a vehicle, the change in the magnetic field becomes lower than the predetermined value, said digital controller generates a signal indicating the absence of a vehicle and resumes said stand-by state.

3. A method according to claim 2, wherein:
    if immediately after said digital controller having received said external interrupt, because the level of illumination detected by said passive optical sensor is below the predefined value, the change in the magnetic field is lower than the predetermined value, said digital controller periodically obtains a value of the level of illumination detected by said passive optical sensor and a value of the magnetic field from said magnetic field sensor;
    if the change in the magnetic field is greater than the predetermined value, the digital controller generates a signal indicating the presence of a vehicle and continues to periodically obtain a value of the level of illumination detected by said passive optical sensor and a value of the magnetic field from said magnetic field sensor;
    if the change in the magnetic field is lower than the predetermined value, or the detected level of illumination is not below the predefined value, said digital controller generates a signal indicating the absence of a vehicle and resumes said stand-by state;
    at any time, if the change in the magnetic field is greater than the predetermined value and the detected level of illumination is not below the predefined value, the digital controller generates an alarm signal.

4. A method according to any one of claims 1 to 3, wherein operative modes and a clock frequency of said digital controller change dynamically depending on signals obtained from said passive optical sensor and said magnetic field sensor.

5. An apparatus for the continuous detection of the presence of a vehicle in a predetermined area, said apparatus comprising a digital controller, a passive optical sensor for detecting a level of illumination, and a magnetic field sensor for detecting and quantifying a magnetic disturbance in a direction in which the Earth's magnetic field is large in accordance with the latitude of the area where said apparatus is used, said passive optical sensor and said magnetic field sensor being activated and powered from said digital controller, wherein said digital controller is configured to perform the following actions:
    in a stand-by state, remain in a low power consumption state and supply power to said passive optical sensor, without supplying any power to said magnetic field sensor;
    in said stand-by state, be awakened from the low power consumption state by said passive optical sensor when the passive optical sensor detects a level of illumination below a predefined value, and activate and power said magnetic field sensor to confirm the presence of a vehicle by detecting and quantifying a magnetic disturbance in a direction in which the Earth's magnetic field is large in accordance with the latitude of the area where said apparatus is used.

6. An apparatus according to claim 5, wherein said digital controller is configured to further perform the following actions:

in said stand-by state, operate in a mode not requiring any clock signal and exit from said mode when said digital controller receives an external interrupt from said passive optical sensor when the detected level of illumination is below the predefined value;

by receiving said external interrupt, move to operate with a clock, activate and power said magnetic field sensor, obtain a value of the magnetic field from said magnetic field sensor and deduce a change of the magnetic field with respect to a reference value of the magnetic field obtained in the absence of a vehicle;

if the change in the magnetic field is greater than a predetermined value, generate a signal indicating the presence of a vehicle and periodically obtain new values of the magnetic field from said magnetic field sensor;

when, after having generated said signal indicating the presence of a vehicle, the change in the magnetic field becomes lower than the predetermined value, generate a signal indicating the absence of a vehicle and resume said stand-by state.

7. An apparatus according to claim 6, wherein said digital controller is configured to further perform the following actions:

if immediately after having received said external interrupt, because the level of illumination detected by said passive optical sensor is below the predefined value, the change in the magnetic field is lower than the predetermined value, periodically obtain a value of the level of illumination detected by said passive optical sensor and a value of the magnetic field from said magnetic field sensor;

if the change in the magnetic field is greater than the predetermined value, generate a signal indicating the presence of a vehicle and continue to periodically obtain a value of the level of illumination detected by said passive optical sensor and a value of the magnetic field from said magnetic field sensor;

if the change in the magnetic field is lower than the predetermined value, or the detected level of illumination is not below the predefined value, generate a signal indicating the absence of a vehicle and resume said stand-by state;

at any time, if the change in the magnetic field is greater than the predetermined value and the detected level of illumination is not below the predefined value, generate an alarm signal.

8. An apparatus according to any one of claims 5 to 7, wherein said digital controller is configured to dynamically change operative modes and clock frequency depending on signals obtained from said passive optical sensor and said magnetic field sensor.

9. An apparatus according to claim 5, wherein said passive optical sensor is a Light-Dependent Resistor, and said magnetic field sensor is a magnetoresistor bridge.

10. An apparatus according to claim 9, wherein said apparatus further comprises an interface circuit for said Light-Dependent Resistor, said interface circuit is a voltage divider powered from an output of said digital controller, and an output of said voltage divider is connected directly and simultaneously to an external interrupt input and to an input of an analog-to-digital converter of the same digital controller.

11. An apparatus according to claim 5, wherein said magnetic field sensor is connected directly to digital input and output ports of said digital controller, without there being any active electronic component between said magnetic field sensor and said digital controller.

* * * * *